Sept. 13, 1966 W. M. BURSTALL 3,272,038
GRIPPING MEANS
Filed April 1, 1965 3 Sheets-Sheet 2
FIG. 3.     FIG. 5.     FIG. 6.
  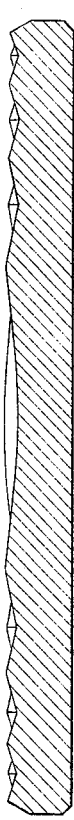
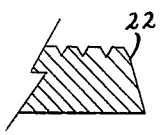
FIG. 9a
FIG. 4.     FIG. 7.     FIG. 8.
 
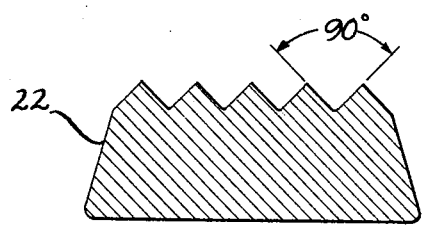
FIG. 9.
WILLIAM M. BURSTALL
INVENTOR.
BY John W. Butcher
ATTORNEY

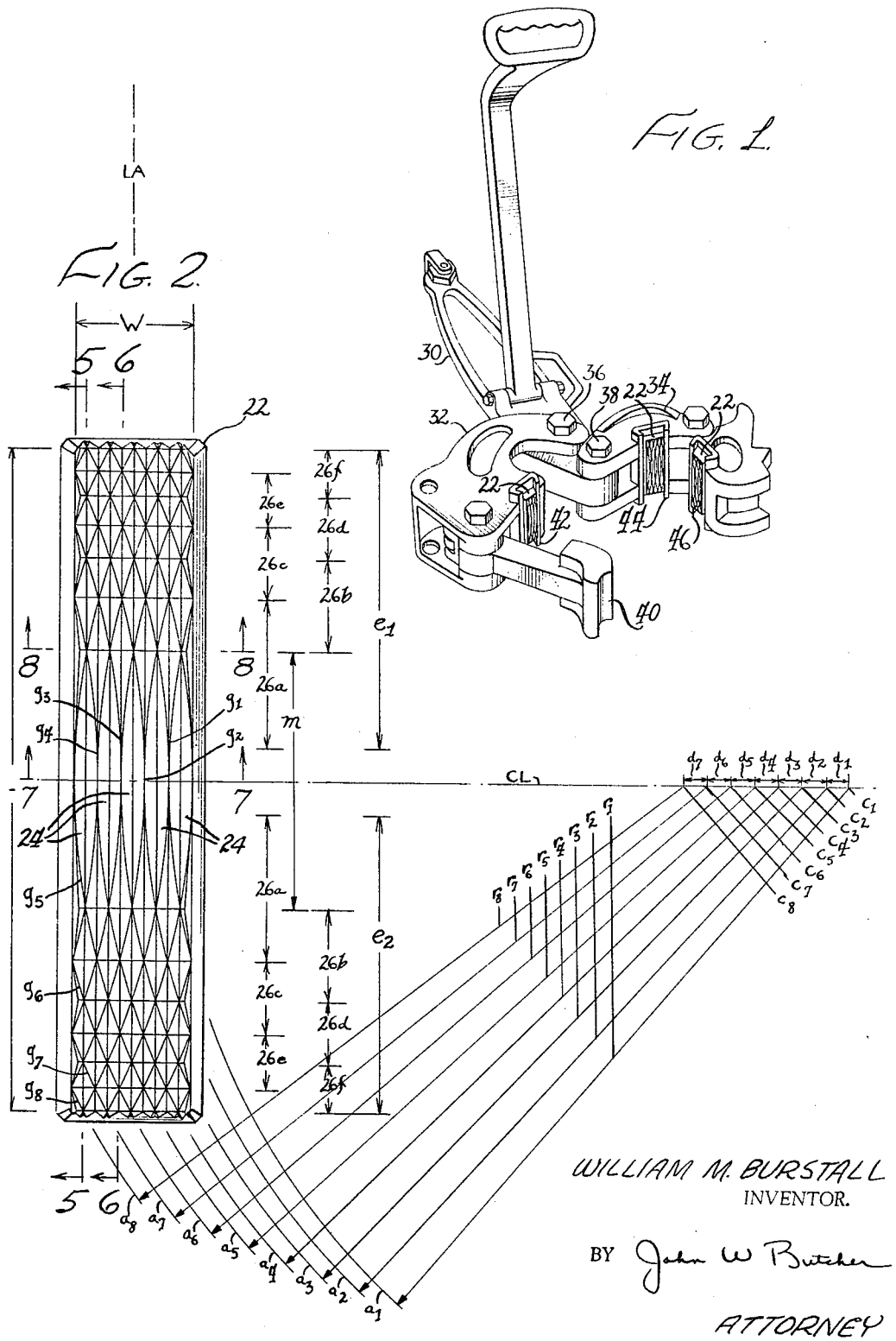

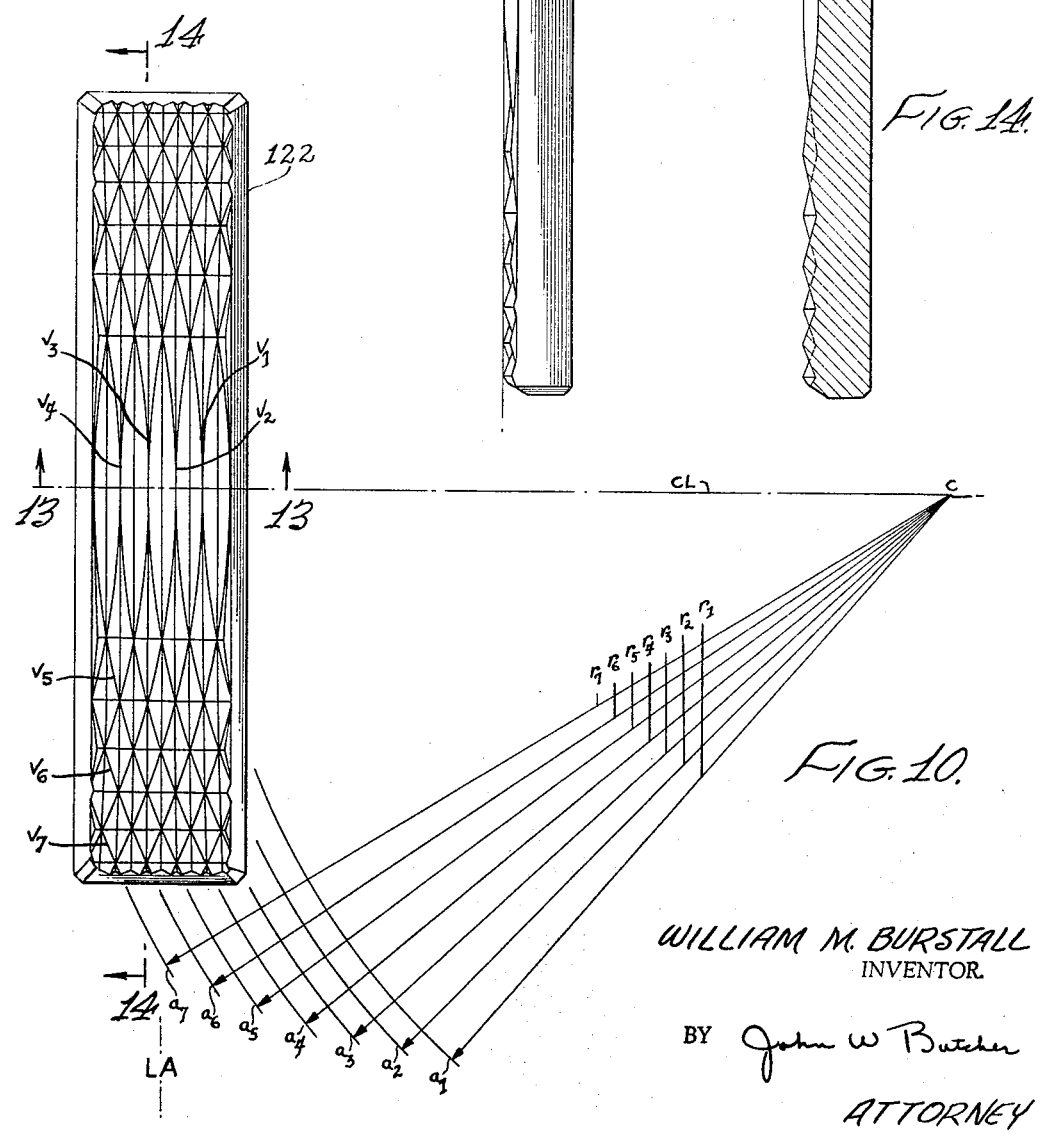

United States Patent Office 3,272,038
Patented Sept. 13, 1966

3,272,038
GRIPPING MEANS
William M. Burstall, Huffman, Tex., assignor to Byron Jackson Inc., Long Beach, Calif., a corporation of Delaware
Filed Apr. 1, 1965, Ser. No. 444,763
14 Claims. (Cl. 81—186)

This invention relates to tools and, more particularly, to a gripping means in combination with a tool for handling pipe and the like.

It is common practice to provide a gripping surface as a part of the body of a tool or wrench. Alternatively, it is also common practice to provide a replaceable die having a gripping surface associated therewith for insertion into a body section of a tool or wrench.

Briefly described, this invention relates to a gripping means defined by a member having a surface which surface has formed therein a first group of arcuate-shaped grooves and a second group of arcuate-shaped grooves. The first group of arcuate-shaped grooves is oppositely disposed with respect to the second group of arcuate-shaped grooves such that the groups are superimposed upon each other to provide a distinctive knurled pattern.

In a preferred embodiment of the present invention, the gripping means is of an elongated configuration with the intersection of the respective groups of arcuate-shaped grooves resulting in the formation of a gripping means having a profile, the elevation of which is a maximum at the midpoint and diminishes in a direction toward the longitudinal ends thereof.

Various objects and advantages of the present invention will be readily apparent to those skilled in the art from the following detailed description and appended drawings illustrating certain preferred embodiments in which:

FIGURE 1 is a perspective view illustrating a tool commonly referred to as a tubing tong having a plurality of insertable dies mounted therein;

FIGURE 2 is a top view of the gripping means formed on the top surface of a die member;

FIGURE 3 is a side view of the die element illustrated in FIGURE 2;

FIGURE 4 is an end view of the die element illustrated in FIGURES 2 and 3;

FIGURE 5 is a cross-sectional view of a die element taken generally along section lines 5—5 of FIGURE 2;

FIGURE 6 is a cross-sectional view of a die element taken generally along section lines 6—6 of FIGURE 2;

FIGURE 7 is a cross-sectional view of the die element taken generally along section lines 7—7 of FIGURE 2;

FIGURE 8 is a cross-sectional view of the die element taken generally along section lines 8—8 of FIGURE 2;

FIGURE 9 is an enlarged view of the grooves as they may be formed in the top surface or face of the die member illustrating a preferred angular relationship of the sides of the grooves with respect to each other as well as with respect to the body of the die element;

FIGURE 9a is an enlarged view of an alternate embodiment of the grooves as they may be formed in the top surface of the die member;

FIGURE 10 is a top view of an alternate embodiment of a gripping means formed on the top surface of a die member;

FIGURE 11 is an end view of the die element illustrated in FIGURE 10;

FIGURE 12 is a side view of the die element illustrated in FIGURES 10 and 11;

FIGURE 13 is a cross-sectional view of a die element taken generally along section lines 13—13 of FIGURE 10;

FIGURE 14 is a cross-sectional view of a die element taken generally along section lines 14—14 of FIGURE 10.

The following detailed description is given for purpose of illustration—not limitation. It is to be understood that although the description relates to forming a gripping means on the top surface of a die member, the same result may be obtained by forming the gripping means on a surface which forms part of a tool body.

Referring now to the drawing, and more particularly FIGURE 2, the gripping means is illustrated as formed on the top surface of a rectangular-shaped block or die member 22. The rectangular-shaped block has a longitudinal dimension "L" and a transverse width dimension "W." In the embodiment illustrated in FIGURE 2, the longitudinal dimension L is greater than the width dimension W and is preferably about four times the width dimension W. This die member preferably is of a trapezodial cross-sectional configuration (see FIGURES 4, 7 or 8).

The gripping means includes a plurality of interrupted or non-continuous ridges. The ridges are developed by forming adjacent grooves in the top surface of the die member. In a preferred embodiment, the top of each ridge is sharp or pointed as a result of the grooves in each group being spaced from each other such that the top edges of adjacent grooves terminate in a common ridge (see FIGURE 9).

An alternate embodiment is a configuration wherein the top of each ridge is flat such as, for example, wherein the top of the ridge coincides with the original top surface of the die member 22. This embodiment may be developed by forming the grooves of each group spaced apart from each other such that the top edge of each groove terminates in the top surface of the rectangular block and is spaced apart from the top edge of the adjacent groove (see FIGURE 9a).

Viewing the grooves in cross-section (see FIGURE 9), the sides of the grooves are at an angle to each other. The embodiment illustrated herein utilizes a groove having sides which are disposed at 90° angles to each other with each side defining a 45° angle to a line perpendicular the original top surface of the rectangular block (see FIGURE 9). Other angular relationships of the sides of the grooves and their orientation with respect to the block may, of course, be made without departing from the spirit and intent of the invention.

The superimposed oppositely disposed groups of grooves define a plurality of interrupted or non-continuous ridges which function as teeth to grip a pipe or like member. The embodiments illustrated herein include a middle portion $m$ and overlapping end portions $e_1$ and $e_2$. The middle portion $m$ includes a plurality of transversely adjacent longitudinally extending elongated ridges 24. The end portions $e_1$ and $e_2$ include a plurality of longitudinally disposed series of transversely adjacent generally diamond-shaped ridges. The diamond-shaped ridges include a first series 26a of transversely adjacent diamond-shaped ridges disposed on each side of the center of the die. The diamond-shaped ridges in this first series are generally equal in size to each other. Subsequent adjacent series 26b–26f inclusive of diamond-shaped ridges are transversely shifted and longitudinally displaced from each other in a direction toward each end of the elongated die member 22. The length of each subsequent series of diamond-shaped ribs, i.e., 26b–26f, is less as the series progresses in a direction away from the middle portion $m$ or first series 26a; however, the width of the diamond-shaped ridges remains substantially constant in all the series. The diamond-shaped ridges in each series are of like size and shape. These ridges are also generally asymmetrical in that the peak of each ridge is shifted in a direction toward the end of the elongated die member.

Referring to FIGURE 2, the gripping means may be formed on the substantially flat top surface of the die member 22 in the following manner. A tool which includes a cutting tip or bit capable of forming a V-shaped groove may be passed through a circular arc $a_1$ across the surface of the die member 22. The circular arc $a_1$ is developed from a radius $r_1$ with a center $c_1$. The tool cuts a groove $g_1$ in the top surface of the die member 22. The center $c_1$ is preferably located on a center line CL. The center line CL is preferably located near the midpoint of the elongated die member 22 and it preferably extends generally perpendicular the longitudinal axis LA of the die member 22. The tool may be repositioned such that a new center $c_2$ is used for the next pass of the tool across the surface of the die member 22. The second pass of the tool is made using a new center $c_2$ which is displaced along the center line CL a distance equal to $d_1$. The second pass may be along a circular arc $a_2$ having a radius $r_2$. This pass cuts groove $g_2$ which is adjacent groove $g_1$. The formation of grooves $g_1$ and $g_2$ results in the formation of a ridge therebetween (see FIGURE 9).

This cutting procedure is repeated such that each additional pass of the tool results in the formation of an additional groove; that is to say, each time the tool is passed through arcs $a_3$–$a_8$ inclusive, grooves $g_3$–$g_8$ respectively are formed. Each of these arcs $a_3$–$a_8$ inclusive is developed from centers $c_3$–$c_8$ respectively and from radii $r_3$–$r_8$ respectively. In this embodiment, the radii $r_1$–$r_8$ are of equal magnitude. The width of the grooves $g_1$–$g_8$ inclusive at the center of the elongated die member 22 is equal to distances $d_1$–$d_7$ inclusive. In this embodiment, the distances $d_1$–$d_7$ inclusive are equal. After forming the above described grooves with their centers on the right side of the elongated die member 22, a similar cutting procedure may be followed to form the oppositely disposed group of grooves. It is desirable to locate the centers on center line CL to the left side of the die equidistant and opposite the aforementioned centers $c_1$–$c_8$ inclusive. Adjacent grooves define ridges therebetween (see FIGURE 9) and thus, due to the fact that grooves $g_1$ and $g_2$ converge as they progress from the center of the die member 22 toward the edge thereof, the ridge which is defined between the two grooves diminishes in width and diminishes in height. This is illustrated in FIGURE 2 by the convergence of arcs $a_1$–$a_8$ due to their development from nonconcentric loci. This phenomenon results in a unique structure in that the profile of the gripping means has a maximum height at the midpoint of the die member and a minimum height at the respective longitudinal ends thereof (see FIGURE 3). This unique profile is referred to as a "crowned" effect.

Referring to FIGURE 10, the gripping means may be formed on the substantially flat top surface of the die member 122 in the following manner. A tool which includes a cutting tip or bit capable of forming a V-shaped groove is passed through a circular arc $a_1$ across the surface of a die member 122. The circular arc $a_1$ is developed from a radius $r_1$ with a center $c$. The tool pass results in the formation of groove $v_1$ in the top surface of the die member 122. The center $c$ is preferably located on the center line CL. The center line CL is preferably located near the midpoint of the elongated die member 122 and preferably extends generally perpendicular the longitudinal axis LA of the die member 122. This tool is subsequently repositioned using the same center $c$ with a new radius $r_2$. The second pass of the tool is made such that the tool is passed through a circular arc $a_2$ across the top surface of the die member 22. The second pass of the tool results in formation of a groove $v_2$ which lies adjacent groove $v_1$. This pass forms a ridge between groove $v_1$ and groove $v_2$.

This cutting procedure is repeated such that each additional pass of the tool results in formation of additional grooves; that is to say, each time the tool is passed through arcs $a_3$–$a_7$ inclusive through radii $r_3$–$r_7$ respectively, grooves $v_3$–$v_7$ respectively are formed. Each of the arcs $a_1$–$a_7$ inclusive has a progressively larger radius than its preceding arc. The arcs $a_1$–$a_7$ inclusive are therefore concentric. The width of the grooves $v_1$–$v_7$ inclusive is preferably equal. Subsequent to formation of this group of grooves having a common center $c$ located on the right side of the elongated die member 122 (FIGURE 10), a second group of oppositely disposed grooves may be formed by using a center located on center line CL to the left side of the die equidistant and opposite the center $c$. A plurality of passes each with an increasing radius and each with a common center may be made to develop a similar group of oppositely disposed grooves. This forms a finished structure as illustrated in FIGURE 10. In this embodiment, the width of each ridge is preferably equal to the width of each groove. The roots of the grooves being equally spaced and being of a configuration defined as being sectors of the circumference of a circular arc with all the grooves in each group being concentric, the finished surface of the gripping means has a profile disposed in a single plane (see FIGURE 12).

The above procedure which has been set forth as a means of forming the embodiments illustrated in FIGURES 2 and 10 has been given by way of example only. It is readily apparent that this particular tool set-up is not the only method of forming the described gripping means. The grooves may be formed by cutting, milling, grinding, or rolling, for example. They may also be formed with single tip or multiple tip tools. This die member may be formed by techniques such as die casting, forging, and/or precision molding. The die member, in certain instances, may be formed from powdered or sintered metal material, depending upon its ultimate intended use such as, for example, when forming a die member for handling plastic pipe.

The embodiment illustrated in FIGURE 2, i.e., the "crowned" profile, is a particularly preferred embodiment in that it provides for an initial engagement by the die and pipe at the center of the die member followed by progressive engagement therebetween until the die is in full engagement with the pipe. This provides a preferred force distribution program within the tool and also minimizes the probability of damaging the die or the pipe, thus substantially increasing the expected life of the die and/or the pipe.

The embodiments described herein include generally diamond-shaped ridges in the end zones in which adjacent series interdigitate with each other to effect an efficient and compact gripping pattern.

The die illustrated in FIGURES 2 and/or 10 may be employed in tools of various designs for gripping pipe and like objects. One form of tool which is especially adapted to utilize dies of the nature described herein is tongs of the class employed in well drilling rigs for handling casing, drill pipe, tubing, rods and the like. Tongs of this general type are illustrated in FIGURE 1. In this figure, tongs include a handle 30. Jaws 32 and 34 are pivotally connected to the handle 30 by pins 36 and 38 respectively. A latch 40 is adapted to hold the jaws 32 and 34 in engagement with the pipe while torque is being applied to the handle 30. The dies are adapted to fit within recesses 42, 44 and 46 formed in the body portions of the jaws. The dies may be replaced from time to time as dictated by wear of the gripping surfaces which are formed on the dies.

Generally preferred dimensional relationships are as follows:

(1) Ratio of the length of the die member (L) to the width thereof (W)—From about 3:1 to about 6:1
(2) Number of series of diamond-shaped ridges in each of the end portions $e_1$ and $e_2$—From about 4 to about 10

(3) Number of longitudinally extending transversely adjacent ribs in said middle portion *m*—From about 3 to about 10

(4) Length of the radii (*r*) used to form grooves (*g*)—Generally about equal to the length (L) and preferably greater than the length (L) of the die member.

The above preferred ranges are believed to define the best mode of operation; however, other specific relationships may be used without departing from the spirit and intent of the present invention which should be limited only by the scope of the appended claims.

Having thus described the present invention, I claim:

1. An elongated gripping means having a middle portion and oppositely disposed end portions adjacent said middle portion comprising a plurality of transversely adjacent longitudinally extending ridges in said middle portion, and a plurality of generally diamond-shaped ridges in each of said oppositely disposed end portions.

2. A gripping means comprising an elongated surface including a plurality of transversely adjacent longitudinally extending ridges in the mid portion thereof, and a plurality of series of generally diamond-shaped ridges on opposite sides of said transversely adjacent longitudinally extending ridges.

3. An article in accordance with claim 2 wherein each of said series is longitudinally displaced from each other.

4. An article in accordance with claim 2 wherein each series extends transversely with respect to said elongated surface.

5. An article in accordance with claim 2 wherein each of said series includes a plurality of transversely adjacent generally diamond-shaped ridges of substantially equal size.

6. An article in accordance with claim 5 wherein each of said generally diamond-shaped ridges is asymmetrical.

7. An article in accordance with claim 2 wherein adjacent series interdigitate with each other to effect a compact gripping pattern.

8. A gripping means comprising an elongated surface including at least two intersecting groups of grooves superimposed upon each other, each of said grooves defining an arc of a circle.

9. An article in accordance with claim 8 wherein said grooves of each of said groups are concentric.

10. An article in accordance with claim 8 wherein said grooves in each of said groups have equal radii.

11. An article in accordance with claim 10 wherein said radii are located on a common line.

12. An article in accordance with claim 10 wherein said radii in both of said groups are located on a common line.

13. An article in accordance with claim 11 wherein said common line extends generally perpendicular the longitudinal axis of said elongated surface.

14. A gripping means comprising an elongated surface including two groups of grooves intersecting each other, adjacent grooves in each of said groups defining a ridge therebetween, each of said grooves defining an arc on a chord of a circle, and said ridges defined by said grooves in turn being disposed in substantially parallel straight lines.

References Cited by the Examiner

UNITED STATES PATENTS

| | | | |
|---|---|---|---|
| 2,609,720 | 9/1952 | Bernard | 81—186 |
| 2,873,636 | 2/1959 | Sherman | 81—186 |
| 2,962,919 | 12/1960 | Grundmann et al. | 81—186 |
| 3,205,736 | 9/1965 | Crickmer | 81—186 |

WILLIAM FELDMAN, *Primary Examiner.*

M. S. MEHR, *Assistant Examiner.*